United States Patent
Mienkina

(10) Patent No.: US 9,996,102 B2
(45) Date of Patent: Jun. 12, 2018

(54) CLOCK CIRCUIT AND METHOD FOR PROVIDING AN ELECTRONIC DEVICE WITH AN ADJUSTABLE CLOCK SIGNAL

(75) Inventor: Martin Mienkina, Bystrice Nad Olsi (CZ)

(73) Assignee: NXP USA, Inc., Austin, TX (US)

( * ) Notice: Subject to any disclaimer, the term of this patent is extended or adjusted under 35 U.S.C. 154(b) by 454 days.

(21) Appl. No.: 13/810,523

(22) PCT Filed: Jul. 20, 2010

(86) PCT No.: PCT/IB2010/053306
§ 371 (c)(1),
(2), (4) Date: Jan. 16, 2013

(87) PCT Pub. No.: WO2012/010927
PCT Pub. Date: Jan. 26, 2012

(65) Prior Publication Data
US 2013/0113527 A1    May 9, 2013

(51) Int. Cl.
*G06F 1/08*   (2006.01)
*G06F 1/32*   (2006.01)

(52) U.S. Cl.
CPC ............... *G06F 1/08* (2013.01); *G06F 1/324* (2013.01); *Y02D 10/126* (2018.01)

(58) Field of Classification Search
CPC .................................. G06F 1/08; G06F 1/324
USPC ................................................. 713/322, 600
See application file for complete search history.

(56) References Cited

U.S. PATENT DOCUMENTS

| | | | |
|---|---|---|---|
| 5,163,146 A | * | 11/1992 | Antanaitis et al. ........... 713/501 |
| 5,392,435 A | * | 2/1995 | Masui et al. .................. 710/260 |
| 5,586,308 A | | 12/1996 | Hawkins et al. |
| 5,802,132 A | | 9/1998 | Pathikonda et al. |
| 6,138,232 A | | 10/2000 | Shiell et al. |
| 6,163,583 A | | 12/2000 | Lin |
| 6,216,234 B1 | | 4/2001 | Sager et al. |
| 6,298,448 B1 | | 10/2001 | Shaffer et al. |
| 6,574,740 B1 | | 6/2003 | Odaohhara et al. |

(Continued)

OTHER PUBLICATIONS

White Paper, "Enhanced Intel Speedstep Technology for the Intel Pentium M Processor", Mar. 2004.
(Continued)

*Primary Examiner* — Chun Cao

(57) ABSTRACT

This invention relates to a clock circuit for providing an electronic device with a clock signal having an adjustable clock frequency. The clock circuit is adapted to receive information regarding a context level of the electronic device and to dynamically control the clock frequency of the clock signal according to the context level. The dynamical control of the clock circuit output frequency based on the context level enables automated power-to-performance control of the electronic device. The invention also relates to an electronic device comprising a context setting unit adapted to set a context level in which the electronic device is operated and a clock circuit. Furthermore, it relates to a method of providing an electronic device with a clock signal having an adjustable clock frequency, wherein a clock circuit receives information regarding a context level of the electronic device; and wherein the clock circuit dynamically controls the clock frequency of the clock signal according to the context level.

20 Claims, 4 Drawing Sheets

(56) References Cited

U.S. PATENT DOCUMENTS

| | | | |
|---|---|---|---|
| 6,600,575 B1 | 7/2003 | Kohara | |
| 6,647,502 B1 * | 11/2003 | Ohmori | 713/322 |
| 6,807,235 B2 * | 10/2004 | Yano et al. | 375/259 |
| 6,990,594 B2 | 1/2006 | Kim | |
| 6,990,598 B2 * | 1/2006 | Sherburne, Jr. | 713/600 |
| 7,042,258 B2 | 5/2006 | Booth et al. | |
| 7,398,414 B2 * | 7/2008 | Sherburne, Jr. | 713/600 |
| 7,451,334 B2 * | 11/2008 | Chen et al. | 713/323 |
| 7,496,170 B2 | 2/2009 | Nelson | |
| 7,506,185 B2 | 3/2009 | Lin | |
| 2003/0028816 A1 | 2/2003 | Bacon | |
| 2003/0071657 A1 | 4/2003 | Soerensen et al. | |
| 2005/0265505 A1 | 12/2005 | Nelson | |
| 2005/0278512 A1 | 12/2005 | Ehlig et al. | |
| 2009/0248935 A1 | 10/2009 | Ehrlich et al. | |

OTHER PUBLICATIONS

AMD, "BIOS and Kernel Developer's Guide for AMD Athlon 64 and AMD Opteron Processors", AMD, pp. 261-293, Feb. 2006.

* cited by examiner

CLOCK CIRCUIT AND METHOD FOR PROVIDING AN ELECTRONIC DEVICE WITH AN ADJUSTABLE CLOCK SIGNAL

FIELD OF THE INVENTION

This invention relates to a clock circuit for providing an electronic device with a clock signal having an adjustable clock frequency, an electronic device with a clock circuit and a method for providing an electronic device with a clock signal having an adjustable clock frequency.

BACKGROUND OF THE INVENTION

Modern electronic devices utilizing microcontrollers and central processing units (CPUs) on one hand have to provide a desired performance, e.g. a given number of calculations in a given time. On the other hand they should be as power-efficient as possible. In particular, they should not require more power than necessary to perform certain tasks. This is particularly true for mobile electronic devices or devices which operate on batteries. Also, microcontrollers performing on-line control and signal measurement with post-processing, e.g. modern power monitoring devices for households, are required to provide high peak performance and low overall power consumption.

The power consumption of an electronic device is closely connected to the clock frequency with which it is operated. The higher the clock frequency, the higher the power it requires. Thus, to reduce the power consumption of an electronic device, the clock frequency the device is operated with can be lowered. However, the clock frequency also determines the computational performance of the device. In modern electronic device hence there are often used methods dynamically controlling the clock frequency to achieve a compromise between high performance and low power consumption.

SUMMARY OF THE INVENTION

The present invention provides a clock circuit, an electronic device and a method for providing an electronic device with a clock signal as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
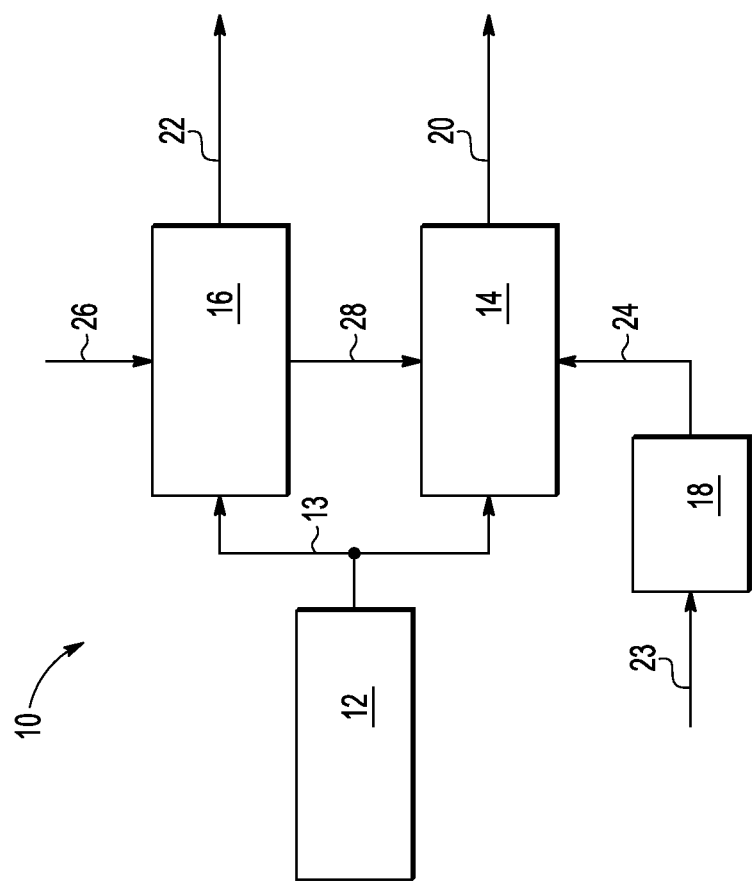
FIG. 1 schematically shows an example of an embodiment of a clock circuit.

FIG. 1 shows an example of a clock circuit 10 for providing an electronic device with a clock signal having an adjustable respectively variable clock frequency. The clock circuit 10 may be adapted to receive information regarding and/or determining a context level of the electronic device and may be adapted to dynamically control the clock frequency of the clock signal according to the context level, in particular in reaction to a change of context level. The clock circuit may comprise a context reception unit adapted to receive the information and/or a frequency control unit for controlling the clock frequency of the clock signal according to the context level. In the embodiment shown in FIG. 1, the context reception unit and the frequency control unit both may be implemented in control unit 18 described further below. A dynamical control of a clock frequency or a device in the context of this specification may be interpreted as describing a control according to information regarding the context level without a direct user input or a software directly causing the control; it may also be interpreted as an automatic control triggered by a context level or a change in context level of the electronic device and may be performed e.g. by hardware in reaction to a dynamical behaviour of the electronic device, in particular to a change in context level.

Clock circuit 10 may provide a clock signal or clock signals to an electronic device, which may include one or more of a microcontroller, central processing unit (CPU), memory, peripheral devices or any other unit or element provided with a clock signal of a given frequency when operated. The electronic device or parts of it may be run in different context levels. A context level may for example be a run level defined by an operating system like a Gnu/Linux-based system or an interrupt level. Interrupt levels define levels of possible interruptions of a normal application of an electronic device to allow processing of applications with higher priorities. Such interrupt levels of the electronic device may be controlled in a way known to a person with ordinary skill in the art, e.g. by associated interrupt and masking registers. There may be a plurality of different interrupt levels. In particular there may be provided two or more or eight or more interrupt levels. Each of a plurality of interrupt levels may be respectively associated to each of a plurality of clock frequencies. The interrupts respectively interrupt levels may be numbered from lowest priority to highest priority. In this example it is assumed that an interrupt level of 0 corresponds to normal execution of applications, but the numbering of the interrupt levels may be arbitrary. An interrupt may be triggered in any suitable way, e.g. by hardware or software, it may e.g. be level-triggered, edge-triggered or message-signalled. Typically, software tasks like performing logic control, processing slowly changing analogue/digital signals, application diagnostics and monitoring are tasks with a low level of priority which may be running at a low interrupt level, e.g. interrupt level 0. Service routines or tasks considered time critical, e.g. processing communication or measurements and performing calculations in or close to real time, dealing with incoming signals, are typically assigned a higher priority and may be associated to a higher interrupt level or higher interrupt levels.

Clock circuit 10 may comprise a clock module 12 having an oscillator unit (not shown) providing a first signal having a first frequency as a basis for the clock signal. Clock module 12 may be implemented in any suitable manner to provide such a first signal with a given first frequency, it may comprise e.g. a phase-locked loop (PLL), a digitally controlled oscillator (DCO), a crystal-based oscillator or a voltage controlled oscillator (VCO) and/or corresponding control elements like one or more filters, feedback paths or phase detectors. It may be envisioned that clock module 12 comprises a frequency scaling unit like e.g. a divider or other elements adapted to receive a signal with a given frequency from an oscillator unit and to modify the frequency of this signal to output a signal, e.g. the first signal. The first frequency of the first signal provided by the clock module 12 may be variable respectively adjustable. Instead of a clock module 12 there may be used any clock structure suitable for providing a first signal with a first frequency.

Clock circuit 10 may comprise one or more postscaler units or postscalers. A postscaler may be adapted to modify or scale an input signal with an input frequency, e.g. the first frequency of the first signal provided by clock module 12, to provide or output a modified output signal respectively postscaled signal which may have a postscaled frequency respectively second frequency as a basis for the clock signal. The second frequency may be different from the first frequency. In particular, a postscaler may be adapted to divide the first frequency by a given divisor value, which may be an integer value. The modification or scaling of a signal by a postscaler may be variable respectively adjustable. The clock circuit 10 may be adapted to control a postscaler to control respectively adjust the clock frequency, e.g. the postscaler may be controlled by a control logic 18 of clock circuit 10. In particular, a divisor value by which a frequency of a signal is divided by a postscaler may be variable respectively adjustable and controlled by such a control logic. It is conceivable that a postscaler with variable respectively adjustable scaling may be set to not modify an input signal in at least on setting. For example, a divisor of a postscaler may be set to be 1.

Shown in FIG. 1 are two postscaler units, namely core-clock postscaler 14 and bus-clock postscaler 16, the functions of which are described in more detail below. A core-clock signal having a core-clock frequency may be provided to the electronic device by core-clock postscaler via line 20. Bus-clock postscaler 16 may provide a bus-clock signal having a bus-clock frequency via line 22 to the electronic device. Thus clock circuit 10 may be envisioned as comprising a core-clock postscaler adapted to provide a core clock frequency and a bus-clock postscaler adapted to provide a bus-clock frequency.

Clock circuit 10 may be adapted to control the core-clock postscaler to control respectively adjust the core-clock frequency. In particular, control logic 18, which may be implemented as a hardware wrapper, may be connected to core-clock postscaler via line 24. Lines 13 may connect the clock module 12 to postscalers 14, 16 to provide the first signal as input signal to core-clock postscaler 14 and to bus-clock postscaler 16. Control logic 18 may receive a control input signal via line 23. Via line 26, an update of the bus-clock postscaler 16 may be performed. Further, a line 28 may be provided to allow synchronization between bus-clock postscaler 16 and core-clock postscaler 14.

Via line 23 information regarding or determining a context level of the electronic device may be provided to control logic 18, in particular to a context reception unit (not shown) of the control logic 18. This information regarding the context level may be information regarding a context level the electronic device switches or switched to. It is feasible that the information corresponds to an interrupt level of the electronic device respectively a CPU of the electronic device or may comprise a signal indicating such an interrupt level. It also may be considered that the information indicates a change or switch of the electronic device to a different interrupt level and/or the interrupt level to which the switch or change was performed.

Upon reception of the information by control logic 18, the control logic may, e.g. by using a frequency control unit of the control logic 18, control via line 24 the core-clock postscaler to postscale respectively modify the input signal provided by the clock module 12 to an output frequency according to the information received. If e.g. the information comprises a signal indicating an interrupt level and the postscaler divides the frequency of the input signal by a divisor value, the control logic 18 may controls the postscaler 14 to divide the frequency of the input signal by a divisor value associated to the interrupt level received.

Control logic 18 may be implemented in hardware or software or a combination of both. It may be adapted to receive information regarding a change in context level, in particular a change of the interrupt level, of the electronic device. It may be considered that the control logic 18 actively polls for the context level, e.g. by reading information from a register of the electronic device, which may be an interrupt status register. It is also feasible that the information is input to control logic 18 by the electronic device. In particular, it may be envisioned that control logic 18 receives input information every time a context level changes. For example, control logic 18 may be provided with a signal indicating a current interrupt level every time the interrupt level changes. If the control logic 18 is provided in hardware, it may control the postscaler 14 to change its output frequency independently of software interaction. This enables in particular a change of the postscaler output before a process enters an interrupt routine, which may significantly reduce interrupt latency and may provide a postscaler output frequency adapted to an interrupt level as soon as the interrupt level is changed. If the control logic is embodied in software, the software would have to wait to change the postscaler output frequency, e.g. by changing a divisor value, until it is running in the corresponding interrupt level, after the interrupt level has been entered. However, a software implementation is easy and cheap to install and update and provides great flexibility.

Bus-clock postscaler 16 may be updated respectively controlled via input line 26, e.g. by a software. In particular, a software running on the electronic device may update the bus-clock postscaler output frequency via line 26, e.g. by changing a divisor value. It may be envisioned that clock circuit 10 is adapted to synchronize the bus-clock postscaler 16 and the core-clock postscaler 14 when the bus-clock postscaler 16 is updated. Synchronisation may be performed if a corresponding synchronisation bit in a register is set or unset. Clock circuit 10 may comprise a synchronisation unit to perform synchronisation. It is feasible that control logic 18 may be adapted to perform synchronisation, e.g. based on whether the synchronisation bit is set or not.

Via line 24 additional updates of the postscaler 14 may be performed. In particular, it is possible to change the content of registers or register entries associated to postscaler 14 even if no change of context level of the electronic device occurs. For example, register entries defining a divisor of postscaler 14 in relation to a given interrupt level (see description below regarding FIG. 2) may be changed if the registers implemented on the postscaler. Such changes may be caused by a software communicating via line 24 with postscaler 14. To this purpose, line 24 may include a connection bypassing the control logic 18, or control logic 18 may be adapted to be an intermediary of such communication. Via line 28 core-clock postscaler 14 may be synchronized with bus-clock postscaler 16 changes to provide compatibility with prior art clock units.

Core-clock postscaler 14 shown in FIG. 1 may provide a core-clock signal with a core-clock frequency to certain elements of the electronic circuit, in particular to a CPU and memory. Bus-clock postscaler 16 may provide a bus-clock signal with a bus-clock frequency to a bus of the electronic device, to which on-chip/off-chip peripheral devices like e.g. timers, AD converters, DA converters, communication modules, sensors, graphic cards, mass storage devices, etc. may be connected. It may be envisioned that the control logic 18 instead of controlling the core-clock postscaler 14 of FIG. 1 controls the bus-clock postscaler 16 or both. In particular, the control logic 18 may be adapted to control postscalers 14 and 16 to provide different frequencies. Instead of the core-clock postscaler 14 and bus-clock postscaler 16 there may be provided any number of postscalers providing different functions. The postscalers may be controlled independently of each other. Postscalers may be connected by synchronization lines similar to line 28 mentioned above. Control logic 18 may be connected to control any of the postscalers of an implementation and/or to any number of different postscalers. In the case that the clock module 12 or a corresponding clock structure may be controlled to provide a signal with variable respectively adjustable frequency, it is also feasible that control logic 18 controls the clock structure or module to provide a desired frequency according to the context level, e.g. by controlling a variable respectively adjustable frequency oscillator. The control logic 18 may control the clock module or structure and one or more postscalers.

Figure 2:
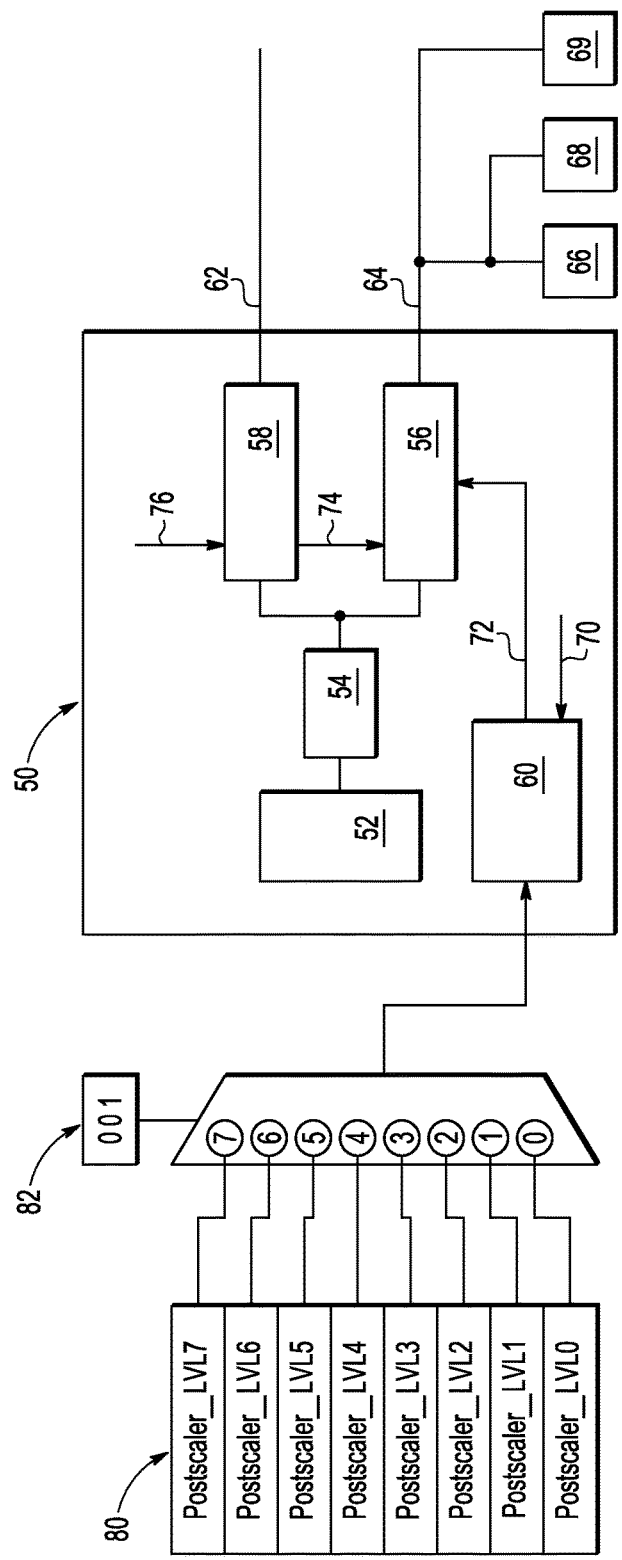
FIG. 2 schematically shows a further example of a clock circuit with a postscaler register.

FIG. 2 shows a clock circuit 50 having a PLL unit 52 to provide a first signal. A first divider 54 is connected to PLL unit 52 to scale the frequency of the first signal. From divider 54 the first signal is distributed to core-clock postscaler 56 and bus-clock postscaler 58. PLL 52 and divider 54 thus may be seen as a clock structure corresponding to clock module 12 of FIG. 1. Hardware wrapper 60 is provided to control core-clock postscaler 56 via line 72. Via line 76 bus-clock postscaler 58 may be provided with updates, information and/or control signals. A line 74 may be used to synchronize bus-clock postscaler 58 and core-clock postscaler 56. The general setup of postscalers 56, 58, the hardware wrapper 60 and lines 72, 74 and 76 is essentially equivalent to the setup of corresponding elements 14, 16, 18, 24, 28 and 26 shown in FIG. 1, so that in the following only the differences will be discussed.

A line 70 to enable or disable hardware wrapper 60 and thus dynamic control of postscaler 56 may be provided. It is feasible that postscaler 56 is set to a default mode, e.g. a pre-set default divisor value, in the case that hardware wrapper 60 is disabled. Clock circuit 50 may be connected to provide an external clock signal or to receive an external clock signal, e.g. from a crystal oscillator, via lines for external input/output XTAL/EXTAL (not shown).

Hardware wrapper 60 may be provided with a postscaler register 80 which may comprise any number of register entries. In particular, register 80 may comprise an array of a plurality of register entries. In the example shown in FIG. 2, register 80 comprises eight register entries Postscaler_LVL0 to Postscaler_LVL7. Each register entry may provide a storage space for holding a value for a postscaler, each value in this case corresponding to a divisor value of postscaler 56. A register entry may be able to store data words of 16 bit length, so each entry may correspond to an integer value between 0 and 65535, which correspond to divisor values between 1 and 65536. The postscaler register respectively its entries may be set by a user or an application. In particular, they may be updated by software. The postscaler register 80 and/or the hardware wrapper 60 may be implemented on the postscaler 56 or may be implemented separately as shown in FIG. 2.

In addition, there is provided a status register SR 82 corresponding to an interrupt level. In the example shown, it is assumed that there are eight interrupt levels, wherein interrupt level 0 corresponds to normal execution. For each interrupt level there may be one corresponding postscaler register entry. However, it may be envisioned that the number of interrupt levels which may be entered by the electronic device and the number of postscaler register entries are not equal. It also may be considered that not all postscaler register entries are set. For unset register entries, a default value may be assumed. For each component the control logic controls according to the information regarding the context level there might be provided one register. Register entries might differ between registers. It is also feasible to use one register defining control parameters for all components controlled by control logic 18. In particular, it may be considered that the output frequency of all components controlled by control logic 18 is scaled by the value stored in one common register entry.

The bus-clock postscaler 58 may adjust its clock frequency, which may be further routed via line 62 to all peripheral devices like e.g. timers, AD converters, DA converters, communication modules, sensors, graphic cards and mass storage devices, etc. connected to the bus. Core-clock postscaler 56 may provide its output clock e.g. to a central processing unit (CPU) 66, a random access memory (RAM) 68 and e.g. a flash memory 69. Thus, CPU and memories may be provided with a clock signal having a frequency based on the signal provided respectively adjusted by the core-clock postscaler 56.

In the example shown in FIG. 2, the status register 82 is set to binary 001 (high-to-low), corresponding to an interrupt level of 1. Based on the status register setting, hardware wrapper 60 checks the register entry corresponding to this interrupt level, in the example entry Postscaler_LVL1, for the value stored. This value is passed on to postscaler 56 as a divisor value by which the frequency of the signal provided to postscaler 56 is to be divided to obtain the output frequency of postscaler 56. The status register 82 may be set to the interrupt level by the electronic device when it switches to this interrupt level. For this purpose, the electronic device may comprise a context setting unit. In the example, it is assumed that a setting of binary 111 of the status register SR corresponds to disabling interrupts. The corresponding postscaler register entry may be Postscaler_LVL7 which may correspond to the highest clock frequency, e.g. by providing the lowest divisor value.

Figure 3:
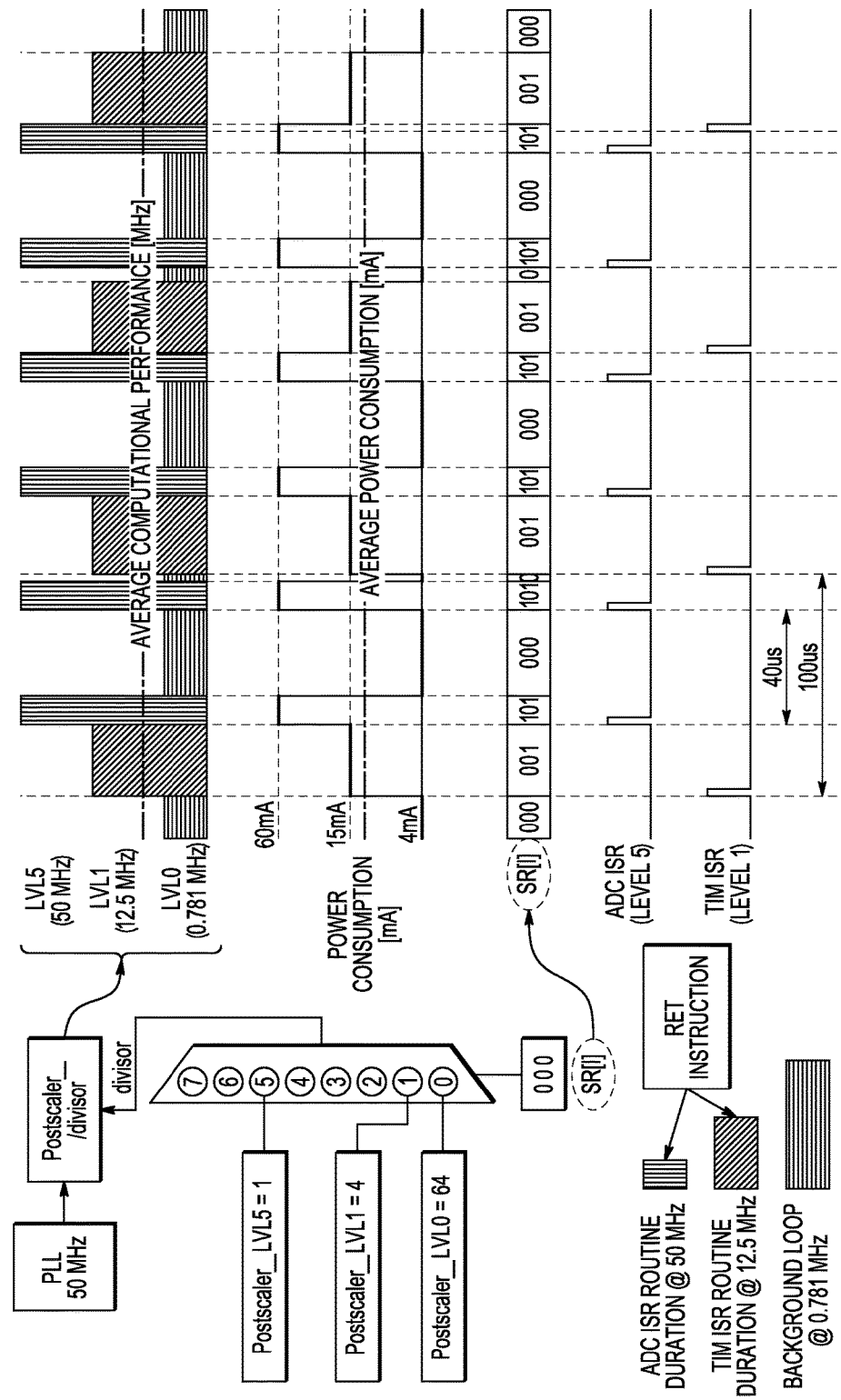
FIG. 3 shows an example of the time behaviour of a clock circuit in use.

Now referring to FIG. 3, there is illustrated a time behaviour of a clock circuit shown only schematically. The clock circuit may comprise a PLL providing a first signal with a first frequency of 50 MHz. The output of the PLL may be provided to a postscaler with a variable respectively adjustable divisor. The divisor of the postscaler may be set to be equal to a value in a register entry of the postscaler register corresponding to an interrupt level as described above. In this example, the frequency output by the postscaler may determine the core-clock frequency of the microcontroller respectively the clock frequency of its CPU.

In FIG. 3, three register entries for the postscaler register are shown as an example. Namely, the register entry value Postscaler_LVL5 for interrupt level 5 may be set to 1, Postscaler_LVL1 for interrupt level 1 may be set to 4 and Postscaler_LVL0, corresponding to normal application execution or interrupt level 0, may be set to 64. If the status register SR[I] is set to binary 000 as shown in FIG. 3, the interrupt level is 0. During interrupt level 0, normal applications may be processed, in particular background loops, which e.g. may monitor a slowly changing parameter. In FIG. 3 it can be assumed that an analog-digital-converter ADC, which might be providing measurement values of a sensor, has a high priority and has associated to it an interrupt level of 5 if it sends an interrupt service request (ISR), while a timer TIM ISR has a lower priority and is only assigned an interrupt level of 1. A phase during which an ADC ISR is processed by the microcontroller is shown as a block with vertical stripes, whereas a phase during which a TIM ISR is processed is shown as a block with oblique stripes. A phase in which the microcontroller is operated normally and e.g. processes a background loop is shown by a block with horizontal stripes. After one of the interrupt requests with interrupt level larger than 0 has been processed, the microcontroller may follow a return (RET) instruction and return to interrupt level 0, e.g. to process the background loop.

As can be seen from FIG. 3, in which the abscissa corresponds to time passed, during interrupt level 0, the postscaler may be running with a divisor value of 64 and may provide a clock frequency of 50 MHz/64=0.781 MHz. At interrupt level 1, the divisor value may be 4 and the postscaler may provide a clock frequency of 50 MHz/4=12.5 MHz, while at interrupt level 5 with a divisor of 1, it may provide the unscaled clock frequency of 50 MHz/1=50 MHz. Of course, the postscaler register entries may be set to other values depending on the desired application. The power consumption of the microcontroller over time is shown in dependence of the current level drawn by the microcontroller. It can be assumed that the voltage supplied is constant over time.

In the example of FIG. 3, the ADC may send an ISR in 40 microsecond intervals, and the TIM may send an ISR in 100 microsecond intervals. A request for an ISR is shown as a pulse in the corresponding ISR line of the diagram.

In FIG. 3, the microcontroller respectively its CPU may start at an interrupt level of 0 and may run a background loop at 0.781 MHz with a low power consumption of 4 mA. As soon as it receives a first ISR of interrupt level 1, the status register SR may be set to binary 001. The CPU may branch into the interrupt process, which may be processed at a clock frequency of 12.5 MHz corresponding to this interrupt level. As can be seen, for interrupt level 1 the power consumption may be higher than for interrupt level 0 and may lie at approximately 15 mA. When an ISR of level 5 is received, the status register may be set to binary 101 and the microcontroller respectively the CPU may process the corresponding interrupt routine with a frequency of 50 MHz, providing a high performance at an increased power consumption of approximately 60 mA. The dashed line shows the time average of performance. The dashed-and-dotted line in the lines showing power consumption shows the time average of power consumption.

It should be noted that in FIG. 3 the control logic may be implemented in hardware which is operated software-independent. Thus, the changed clock speed, in particular the increased clock speed for higher interrupt levels, may be available for processing the interrupt before the interrupt routine is processed. If the postscaler had to be changed by software, i.e. by the interrupt routine itself, the interrupt processing would be performed at a lower clock frequency until the appropriate change has been executed.

As can be seen, the clock circuit allows an optimized use of a microcontroller or CPU-based on interrupt levels and provides great flexibility in the management of clocks and clock frequencies. In particular, the control circuit can provide an adequate performance for an application based on its importance, and peak performance if required, but can ensure a power-efficient use of the CPU. Hence a required average performance/power consumption ratio can be provided. The clock circuit may be adapted to control the electronic device such that more important code, e.g. with a high interrupt level, may be processed with high performance (high clock frequency) and accordingly higher power consumption, whereas less important code may be processed with lower performance (lower clock frequency) and less power consumption. By utilizing a core-clock postscaler and a bus-clock postscaler and controlling the core-clock postscaler according to a context level or information regarding a context level, it is possible to avoid frequent changes of the bus-clock frequency, such that data exchange with peripheral devices connected to the bus is performed reliably. By utilizing a hardware wrapper it is possible to shorten interrupt latency times and to provide a quick change of clock frequency as soon as a corresponding interrupt level is entered. Implementing the control logic in software may be cheaper and may provide a greater flexibility.

A clock circuit as described above may be implemented separately or as a part of an electronic device which it provides with a clock signal. Such an electronic device may be a microcontroller having a CPU, which might be operated in different interrupt levels. The clock circuit may also be used with a personal computer (PC) or other computer system. On a PC, the clock circuit may be located close to the interrupt control unit (e.g. a programmable interrupt controller PIC), which is usually arranged on the Southbridge of a computer mainboard. The electronic device may comprise a context setting unit adapted to set a context level in which the electronic device is operated. It is feasible that the electronic device is adapted to provide information regarding a context level of the electronic device to the clock circuit. In particular, the electronic device may be adapted to provide information regarding the context level if the context level changes, e.g. if the electronic device switches to a different interrupt level.

Figure 4:
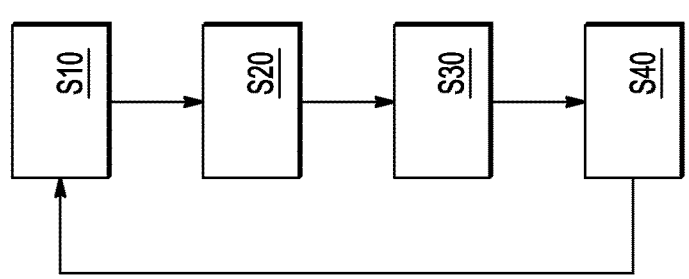
FIG. 4 schematically shows a method of providing an electronic device with a clock signal.

FIG. 4 shows a schematic diagram of a method to provide an electronic device with a clock signal having a variable respectively adjustable clock frequency. This method may be applied in the context of one of the clock circuits or electronic devices described above.

The method shown in FIG. 4 may comprise a step S10, in which a context level of an electronic device is changed. In particular, the interrupt level of the electronic device might change. The change of context level may be communicated to a clock circuit respectively a control logic. It is feasible that the method stays in step S10 until a change in context level occurs.

In step S20, the clock circuit respectively the control logic may receive information regarding respectively determining the context level of the electronic device which in particular may refer to a change of context level, e.g. the information may be referring to a context level the electronic device switches or switched to. It may be considered that the context level is an interrupt level of the electronic device. The information may be an indication that the electronic device enters a new interrupt level and may identify the new interrupt level.

In step S30, the clock circuit or the control logic may dynamically control the clock frequency of a clock signal according to the context level. It may be envisioned that an element of a clock structure or clock module, like e.g. a variable respectively adjustable frequency oscillator or a postscaler, is controlled to provide the clock signal with a desired frequency. The clock circuit may provide a bus-clock signal with a bus-clock frequency and a core-clock signal with a core-clock frequency. The core-clock frequency may be controlled according to the information regarding the context level. In step S30, a divisor of a postscaler may be set to control the output frequency of the postscaler.

In step S40, the method returns back to step S10.

It may be envisioned that the clock circuit provides a bus-clock signal with a bus-clock frequency and a core-clock signal with a core-clock frequency and that the core-clock frequency is controlled according to the context level. However, as explained above, it is also feasible that both postscalers are controlled or a different arrangement of postscalers and/or oscillators is controlled according to this method.

The clock circuit with adjustable clock frequency based on the operational mode and/or desired computational performance of the driven electronic device enables power-efficient control of the electronic device.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. For example, the hardware wrapper may be included in a circuit setting an interrupt level or may be implemented on a postscaler.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the postscalers and/or the hardware wrapper may be arranged on the same device as an oscillator and additional elements of a clock unit, providing an integrated clock structure. Alternatively, the examples may be implemented as any number of separate integrated circuits or separate devices interconnected with each other in a suitable manner. For example, postscalers may be arranged separately from a clock module providing a signal from an oscillator.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but may also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A clock circuit for providing an electronic device with a clock signal having an adjustable clock frequency,
   the clock circuit to receive first information regarding a first interrupt level of the electronic device, and to receive second information regarding a second interrupt level of the electronic device;
   a hardware wrapper of the clock circuit to be enabled or disabled based on a control signal;
   in response to the hardware wrapper being disabled, the clock circuit to control the clock frequency of the clock signal according to a default divisor value; and
   in response to the hardware wrapper being enabled, the clock circuit to dynamically control the clock frequency of the clock signal according to the first information regarding the first interrupt level and to the second information regarding the second interrupt level, wherein the clock frequency of the clock signal is selected from a postscaler register based on an interrupt level.

2. The clock circuit of claim 1, wherein the clock circuit comprises a clock module having an oscillator unit adapted to provide a first signal having a first frequency as a basis for the clock signal.

3. The clock circuit of claim 1, wherein the clock circuit comprises at least one postscaler adapted to modify an input signal with a first frequency to provide a modified output signal having a second frequency as a basis for the clock signal, wherein the second frequency may be different from the first frequency.

4. The clock circuit of claim 3, wherein the clock circuit is adapted to control the postscaler to control the clock frequency.

5. The clock circuit of claim 1, wherein the clock circuit comprises a core-clock postscaler adapted to provide a core-clock frequency and a bus-clock postscaler adapted to provide a bus-clock frequency.

6. The clock circuit of claim 5, wherein the clock circuit is adapted to control the core-clock postscaler to control the core-clock frequency.

7. The clock circuit of claim 5, wherein the clock circuit is adapted to synchronize the bus-clock postscaler and the core-clock postscaler when the bus-clock postscaler is updated.

8. The clock circuit of claim 1, wherein the information regarding the interrupt level is information regarding an interrupt level the electronic device switches or switched to.

9. An electronic device comprising
   a context setting unit for setting a context level in which the electronic device is operated; and a
   control circuit according to one of claim 1.

10. A method of providing an electronic device with a clock signal having an adjustable clock frequency, the method comprising:
    receiving, at a clock circuit, first information regarding a first interrupt level of the electronic device;

receiving, at the clock circuit, second information regarding a second interrupt level of the electronic device;

enabling or disabling a hardware wrapper within the clock circuit based on a control signal;

in response to the hardware wrapper being disabled, controlling the clock frequency of the clock signal according to a default divisor value; and in response to the hardware wrapper being enabled, dynamically controlling, at the clock circuit, the clock frequency of the clock signal according to the first information regarding the first interrupt level and to the second information regarding the second interrupt level, wherein the clock frequency of the clock signal is selected from a value of postscaler register provided to the hardware wrapper based on an interrupt level.

11. The method of claim 10, wherein the clock circuit provides a bus-clock signal with a bus-clock frequency and a core-clock signal with a core-clock frequency and the core-clock frequency is controlled according to the information regarding the context level.

12. The method of claim 10, wherein the information regarding the interrupt level is information defining interrupt level the electronic device switches or switched to.

13. The method of claim 10, further comprising:
modifying, at a postscaler, an input signal with a first frequency to provide a modified output signal having a second frequency as a basis for the clock signal, wherein the second frequency may be different from the first frequency.

14. A clock circuit comprising:
a core-clock postscaler to provide a core-clock frequency based on a clock signal having an adjustable clock provided an electronic device; and
a hardware wrapper configured to communicate with the core-clock postscaler, the hardware wrapper to be enabled or disabled based on a control signal, in response to the hardware wrapper being enabled, the hardware wrapper to: receive first information regarding a first interrupt level of the electronic device; dynamically control the clock frequency of the clock signal according to the first information regarding the first interrupt level; receive second information regarding a second interrupt level of the electronic device; and dynamically control the clock frequency of the clock signal according to the second information regarding the second interrupt level, wherein the clock frequency of the clock signal is selected from a postscaler register based on an interrupt level, and wherein a change of an output of the core-clock postscaler is changed before a process enters an interrupt routine;

in response to the hardware wrapper being disabled, the core-clock postscaler to provide the core-clock frequency based on a default divisor value.

15. The clock circuit of claim 14, further comprising:
a clock module having an oscillator unit adapted to provide a first signal having a first frequency as a basis for the clock signal.

16. The clock circuit of claim 14, further comprising:
a bus-clock postscaler configured to communicate with the core-clock postscaler, the bus-clock postscaler to provide a bus-clock frequency that is synchronous with the core-clock frequency.

17. The clock circuit of claim 13, wherein the core-clock postscaler to modify an input signal with a first frequency to provide a modified output signal having a second frequency as a basis for the clock signal, wherein the second frequency may be different from the first frequency.

18. The clock circuit of claim 14, wherein information regarding the interrupt level is which interrupt is the current interrupt of a plurality of interrupts each associated with a different interrupt level.

19. The clock circuit of claim 1, wherein the clock frequency of the clock signal is changed in response to every time a change occurs in the interrupt level.

20. The clock circuit of claim 1, wherein the interrupt level defines a priority level of an interruption of a normal application.

* * * * *